United States Patent
Pavlyushchik et al.

(10) Patent No.: US 11,003,772 B2
(45) Date of Patent: May 11, 2021

(54) SYSTEM AND METHOD FOR ADAPTING PATTERNS OF MALICIOUS PROGRAM BEHAVIOR FROM GROUPS OF COMPUTER SYSTEMS

(71) Applicant: AO Kaspersky Lab, Moscow (RU)

(72) Inventors: Mikhail A. Pavlyushchik, Moscow (RU); Yuri G. Slobodyanuk, Moscow (RU); Alexey V. Monastyrsky, Moscow (RU); Vladislav V. Martynenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 238 days.

(21) Appl. No.: 16/010,923

(22) Filed: Jun. 18, 2018

(65) Prior Publication Data

US 2019/0121975 A1    Apr. 25, 2019

Related U.S. Application Data

(60) Provisional application No. 62/574,495, filed on Oct. 19, 2017.

(51) Int. Cl.
G06F 21/56    (2013.01)
(52) U.S. Cl.
CPC .......... G06F 21/561 (2013.01); G06F 21/566 (2013.01); G06F 21/568 (2013.01); *G06F 2221/033* (2013.01)
(58) Field of Classification Search
None
See application file for complete search history.

(56) References Cited

U.S. PATENT DOCUMENTS 9,794,287 B1    10/2017   Koster et al.
2011/0055123 A1*  3/2011  Kennedy ............... G06N 5/045
                                                706/12

(Continued)

FOREIGN PATENT DOCUMENTS

WO    2017/083436 A1    5/2017

OTHER PUBLICATIONS

AO Kaspersky Lab, "Kaspersky Endpoint Security 10 for Windows" [online] Oct. 6, 2015 [retrieved on Apr. 11, 2020]. Retrieved from: http://www.codine.es/descargas/kes10/kes10sp1mr2_en/Documentation_10.2.4.674_en.pdf (Year: 2015).*

*Primary Examiner* — Taghi T Arani
*Assistant Examiner* — Joshua Raymond White
(74) *Attorney, Agent, or Firm* — Arent Fox LLP; Michael Fainberg

(57) ABSTRACT

Disclosed are systems and methods for adapting a pattern of dangerous behavior of programs. A teaching module may load into an activity monitor the pattern and establish a first usage mode for it, during which the activity monitor detects threats that correspond to that pattern, but does not perform actions for their removal. Later, in the course of a teaching period, the activity monitor detects threats based on the detection of events from the mentioned pattern. If the events have occurred as a result of user actions, and the events have a recurring nature or are regular in nature, the teaching module adds parameters to the pattern which exclude from subsequent detection those events or similar events. Upon expiration of the teaching period, the teaching module converts the pattern of dangerous behavior of programs to the second usage mode, during which threats are detected using the modified pattern and removed.

15 Claims, 6 Drawing Sheets

(56) References Cited

U.S. PATENT DOCUMENTS

| | | | | |
|---|---|---|---|---|
| 2011/0126286 | A1* | 5/2011 | Nazarov | G06F 21/564 |
| | | | | 726/24 |
| 2013/0305365 | A1* | 11/2013 | Rubin | G06F 21/552 |
| | | | | 726/23 |
| 2015/0128274 | A1* | 5/2015 | Giokas | H04L 63/1425 |
| | | | | 726/23 |
| 2015/0288709 | A1* | 10/2015 | Singhal | H04L 63/1425 |
| | | | | 726/23 |
| 2015/0339477 | A1* | 11/2015 | Abrams | G06F 21/554 |
| | | | | 726/23 |
| 2016/0350675 | A1* | 12/2016 | Laks | G06N 20/20 |
| 2017/0126728 | A1* | 5/2017 | Beam | H04L 63/14 |
| 2018/0077187 | A1* | 3/2018 | Garman | H04L 63/1425 |

\* cited by examiner

SYSTEM AND METHOD FOR ADAPTING PATTERNS OF MALICIOUS PROGRAM BEHAVIOR FROM GROUPS OF COMPUTER SYSTEMS

CROSS-REFERENCE TO RELATED APPLICATIONS

This application claims the benefit of U.S. Provisional Application No. 62/574,495, filed Oct. 19, 2017, which is herein incorporated by reference.

FIELD OF TECHNOLOGY

The present disclosure relates to heuristic methods of protecting computer systems against malicious programs, and more specifically, to methods of using patterns of dangerous behavior of programs with a high level of false detections.

BACKGROUND

In a modern solution for antivirus protection of computer systems, several layers of protection should be provided. Besides classical signature verification, that is, the search for a dangerous, unknown program using antivirus databases, an antivirus application should also possess capabilities of behavioral detection—that is, be able to recognize a threat from the behavior of a program. Such an approach enables an effective detection of new and unknown threats.

Activity monitors are part of present-day antivirus products and they afford a proactive protection of computer systems. They monitor all program processes, comparing their behavior with characteristic models of malicious programs. A suspicious program that is detected may, for example, be automatically placed in quarantine. Based on information gathered by the monitor, a rollback of the actions carried out by malicious programs in the operating system may be performed when healing the system of the malicious programs. Furthermore, the activity monitor constantly controls access to files, and when access to them is requested, the activity monitor saves temporary backup copies of the files. Therefore, if an antivirus product detects an attempt to encrypt any files, the existence of the temporary backup copies will enable a reversion of the data to its original form.

Such safety systems for threat detection utilize patterns of dangerous behavior of programs. The patterns are often developed manually by the specialists of antivirus companies and contain sequences of program actions that the antivirus product classifies as dangerous. Among the patterns of dangerous behavior of programs which are being developed is a category of patterns which allow an effective detection of malicious behavior in a range of scripts, yet when these patterns are used there is a substantial risk of false detections (FD) occurring in a particular environment. However, despite the high level of false detections, the use of such patterns can significantly raise the quality of the behavioral detection of malicious programs by an antivirus product.

SUMMARY

Aspects of the present disclosure are designed to adapt a pattern of dangerous behavior of programs to the computer system of a user and to selectively use a pattern of dangerous behavior of programs on a group of computer systems. The technical result of aspects of the present disclosure includes a reduction in the number of false threat detections when using the pattern of dangerous behavior of programs on the computer system of a user.

According to one aspect, a computer-implemented method for detecting malicious programs is provided. The method includes launching, by a remote security control module, a pattern of dangerous behavior of programs in a first mode on a group of computer systems, wherein an antivirus application running on each of the computer systems detects threats corresponding to the pattern, but does not perform removal actions on the threats. The method further includes assembling a plurality of threat detection statistics relating to the threats corresponding to the pattern, for each computer system in the group of computer systems over a first period of time. For each computer system in the group of computer systems for which number of false detections on the respective computer system does not exceed a threshold count, the remote security control module adds to the pattern of dangerous behavior of programs the false detections corresponding to the respective computer system as exceptions, and converts the pattern of dangerous behavior of programs to an active usage mode.

In another aspect, using the pattern of dangerous behavior of programs in the active usage mode includes the antivirus application running on the computer system detecting threats corresponding to the pattern and performing actions for removal of the detected threats.

In another aspect, the number of false detections is determined based on checking a program corresponding to a threat using a database of trusted programs.

In another aspect, the plurality of threat detection statistics includes a threat identifier, a pattern identifier, and names and hash sums of files and processes pertaining to the detected threat.

In another aspect, the plurality of threat detection statistics includes a list of events having occurred on a computer system and associated event parameters, which have led to the detection of a threat with the aid of the pattern.

In another aspect, wherein a false detection is determined based on whether the events have occurred as a result of user actions and whether the events have been detected more than a threshold number of times within a given period of time.

In another aspect, determining that the events have occurred as a result of user actions includes detecting activity of the user on the computing system comprising at least one of an interaction of the user with elements of a graphic user interface of the computing system, and an interaction of the user with an input device of the computing system.

According to another aspect of the present disclosure, a system for detecting malicious programs is provided. The system includes a network interface configured to communicatively connect the system to a group of computer systems, and a hardware processor. The hardware processor is configured to: launch, by a remote security control module, a pattern of dangerous behavior of programs in a first mode on the group of computer systems. An antivirus application running on each of the computer systems detects threats corresponding to the pattern, but does not perform removal actions on the threats. The processor is further configured to assemble a plurality of threat detection statistics relating to the threats corresponding to the pattern, for each computer system in the group of computer systems over a first period of time. For each computer system in the group of computer systems for which a number of false detections on the respective computer system does not exceed a threshold count, the processor is configured to add to the pattern of dangerous behavior of programs the false detections corresponding to the respective computer system as exceptions, and convert the pattern of dangerous behavior of programs to an active usage mode.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
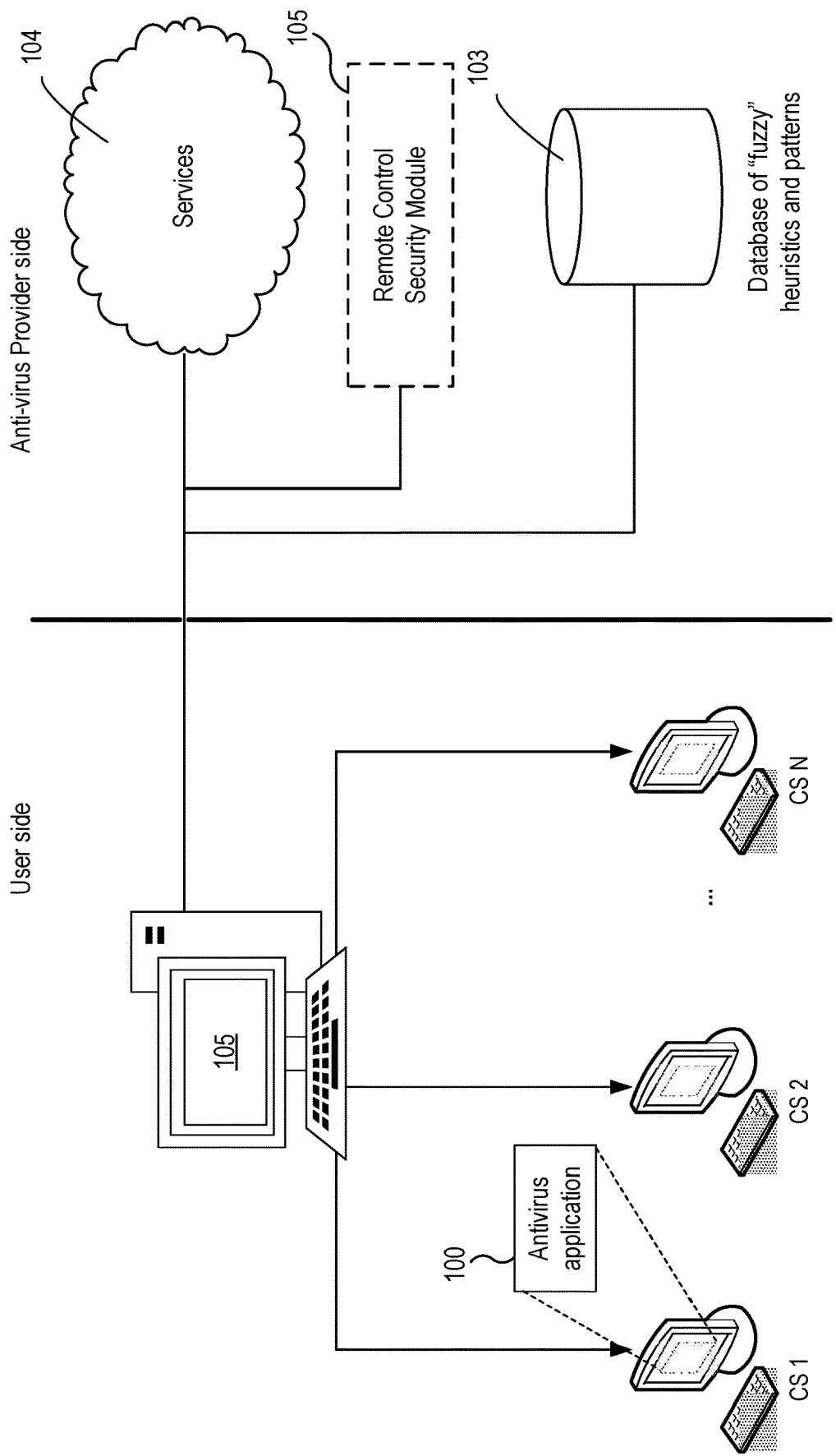
FIG. 1A is a block diagram illustrating a system of adapting patterns of dangerous behavior of programs to the computer systems of users according to an exemplary aspect.

The objects and features of the present invention, and the methods of achieving these objects and features, will become evident by referral to variant sample embodiments. However, the present invention is not limited to the variant sample embodiments disclosed below, and it may be embodied in different forms. The essence presented in the description is merely specific details needed to assist an expert in the field of technology for a comprehensive understanding of the invention, and the present invention is defined in the scope of the appended claims.

An activity monitoring module is part of most antivirus applications running on the computer systems of users. This component monitors the activity of the programs (processes) launched and enables a real-time analysis of their actions. For example, if a system register has been changed, or a boot sector or file has been changed, then information on the events having occurred is written into a special database. This data may be used afterwards to restore the computer system to its original condition. In addition, the activity monitoring module includes a set of patterns of dangerous behavior of programs—models of behavior that can be used to identify an unknown malicious software. Furthermore, the activity monitoring module exchanges information with other components of the antivirus software and, by remembering the chains of events, forms an overall picture of the behavior and registers the traces of each individual program and of groups of programs, and also monitors the actions of programs not only in the current session, but also over the course of the entire life cycle of the program. This significantly enhances the accuracy of detection of malicious programs.

The pattern of dangerous behavior of programs (or BSS, Behavior Stream Signature) contains a group of events whose occurrence in the context of a computer system leads to the detection of a threat corresponding to that pattern. The fulfillment of the pattern requires the activity monitoring module to detect a threat. Hereafter in the text, for simplicity, we shall call the pattern of dangerous behavior of programs "the pattern". The events enumerated in the pattern may be related to system calls by means of which processes interact with any given objects within the operating system, such as files, data loaded into RAM, or other processes. The events may be related to network traffic, specifically the identification in this traffic of certain sequences of data or the determination of its current characteristics. Events may also be related to analysis of the code loaded into RAM—the activity monitoring module can read data from any given sectors of RAM and perform an analysis on them.

The events enumerated in the pattern may be clarified by indicating parameters (event parameters) which a given event should conform to. These parameters may be, for example, the identifiers of processes, addresses and address ranges in memory, files, their identifiers and directories. Besides events, the patterns may also use conditional and logic operators, for example, these may determine the timeframes and sequence of occurrence of the events in the pattern. Moreover, the pattern may include examination requests and verdicts from other security systems, since the activity monitoring module may exchange information with other components of the antivirus software, both local and remote. For example, the pattern may contain a request to list trusted programs, in order to determine whether a process carrying out actions on the computer system is known and trusted or not.

The detection of a threat corresponding to a pattern occurs when the activity monitoring module has identified all the events of said pattern. In other words, all of the events enumerated in the pattern have occurred within the computer system and the facts of these events having occurred have been registered by the activity monitoring module. The set of events enumerated in the pattern characterizes a particular attack vector, making it possible to locate a malicious object in the computer system being used to carry out cyberattacks, as well as targeted cyber-attacks. The activity monitoring module monitors events within the computer system by any method known in the prior art, for example in a particular embodiment for the operating systems of the Windows family the monitoring of events may be performed by installing the corresponding driver filters.

The threats corresponding to patterns in the context of the present disclosure are malicious programs. The malicious programs discovered with the aid of a pattern are identified by files pertaining to a given malicious program, such as an executable file, and/or by a process, that is, an actively executable malicious program loaded into the RAM of the computer system. For example, a naïve or elementary pattern for identifying a threat such as ransomware—a variety of malicious programs which encrypt data important to the user on the computer system in order to extort money—contains in the original form the event "making changes to a file" and is triggered by an alteration to any given file initiated by any given process. Such a pattern cannot be used without adapting it to a specific computer system, inasmuch as that pattern is formulated too broadly and the event of "making changes to a file" is not in itself malicious. As a consequence, the use of this pattern leads to a large number of false detections, also referred to as false positives, in which results incorrectly characterize programs as malicious (even though they are in fact not). Naturally, this example is given only as an illustration, and the actual pattern is not described so broadly, but instead contains a multitude of parameters, conditions, and exceptions making possible a significant reduction in the number of false detections.

Falsely detected threats are trusted programs which are identified as malicious by a corresponding pattern, despite not being of such a nature [malicious]. The determination of whether a threat detected with the aid of a pattern is falsely detected is performed by additional verifications. One of these is performed with the aid of the activity monitoring module and a subsystem for monitoring user actions. This verification method shall be described below. Another way of determining whether a detected threat has been falsely detected is a verification of programs corresponding to identified threats using databases of trusted programs.

As mentioned above, traditionally, the patterns are developed manually by the specialists of antivirus companies. As soon as a pattern is created, it needs to be tested and its efficacy or effectiveness determined, for which purpose the pattern is loaded onto all the computer systems of users and launched in silent mode. Silent usage mode (or first usage mode) is a mode of using a pattern in which the activity monitoring module detects threats corresponding to that pattern on a computer system, but does not perform actions for their removal. Accordingly, the active usage or pattern application mode (second usage mode) is the mode of using patterns during which the activity monitoring module detects threats corresponding to that pattern on a computer system and performs the actions for their removal. A pattern works for a certain period of time in silent mode on the computer systems of users, while statistics of the threats detected on the computer systems with the use of that pattern are gathered on a remote server. The statistics may include at least the following data: the threat identifier, the pattern identifier, the names and hash sums of the files and processes pertaining to the detected threat. These statistics are afterwards analyzed by the specialists of the antivirus company, and changes are made to the pattern which enhance the effectiveness of use of that pattern, that is, enabling a reduction in the number of false detections. In the course of analysis of the statistics gathered, all threats detected by using the pattern are checked to see whether they are falsely detected threats. This checking can be performed by checking the files and processes pertaining to the detected threat using lists of trusted files and programs. The updated pattern is again loaded onto the computer systems of the users and once more started in silent mode. This cycle of manual updating of the pattern is repeated until the number of false detections of threats corresponding to the pattern is equal to zero or does not exceed a given value in the collected statistics of use. After this, those patterns are converted to the application mode. However, the level of false threat detections may not be reducible to zero for certain patterns, as in the case of the pattern for identifying malicious programs encrypting user data, for example. For such patterns, the level of false detections can only be brought down to a certain level (such as <3%). At this level of false detections, the use of the pattern on an indefinite number of computer systems is still not possible, although such a pattern may be adapted with the help of aspects of the present disclosure for use on each particular computer system.

In the context of the present application, a method is implemented for the use of patterns whose level of false detections is not equal to zero. This method involves changing the parameters of a pattern of dangerous behavior of programs for a computer system whereby the pattern is used in silent mode on the computer system of the user for a certain period of time (a teaching period). During the teaching period, parameters are added to the pattern with the help of a teaching module, which parameters make it possible to exclude from the next detection those events for which both of the following conditions are fulfilled: the event has occurred as a result of user actions; and the event is regular in nature, i.e., it has been registered with the aid of the activity monitoring module more than a predefined number of times. After this, the pattern is converted to application mode.

In order to determine whether a particular event is related to user actions, the activity monitoring module contains a subsystem for monitoring user actions, which monitors the interactions of the user with the graphic user interface of the operating system by means of input interfaces. The interfaces of the operating system refers to the means and methods of interaction of users with a computer operating system or program. In the context of the present disclosure, one may distinguish between the graphic user interface (the interaction with the computer is organized with the aid of pictograms, menus, dialog windows, etc.) and the input interfaces (means of user interaction with the computer). The input interfaces may be, for example, data entry means such as a keyboard, a mouse, or sensory control elements, and also means of photo, video and audio capturing of data and other means. The subsystem for monitoring user actions registers the commands coming from the input interfaces in the process of interaction of the user with the graphic user interface of the operating system, and thus determines which events in the context of the computer system have occurred as a result of user actions.

That is, aspects of the present disclosure characterize certain events occurring as a result of user actions as suggestive of legitimate behavior, in contrast to certain events resulting from programmatic or automatic behavior, which may suggest malicious activity. For example, the activity monitoring module may detect an event pertaining to a deletion of or modification to a file and determine that the event is the result of a user's interactions with a user interface, including mouse input navigating a cursor to a file icon, mouse input selecting the file icon (e.g., <mouse click>), and keyboard input (e.g., <DELETE> key) indicating a deletion of the user. This type of activity, despite possibly matching a malicious-program pattern, may be legitimate behavior. In contrast, in the absence of such user actions, this type of activity (when matching a pattern) could be the result of a malicious program, for example, deleting files or encrypting them.

Figure 1B:
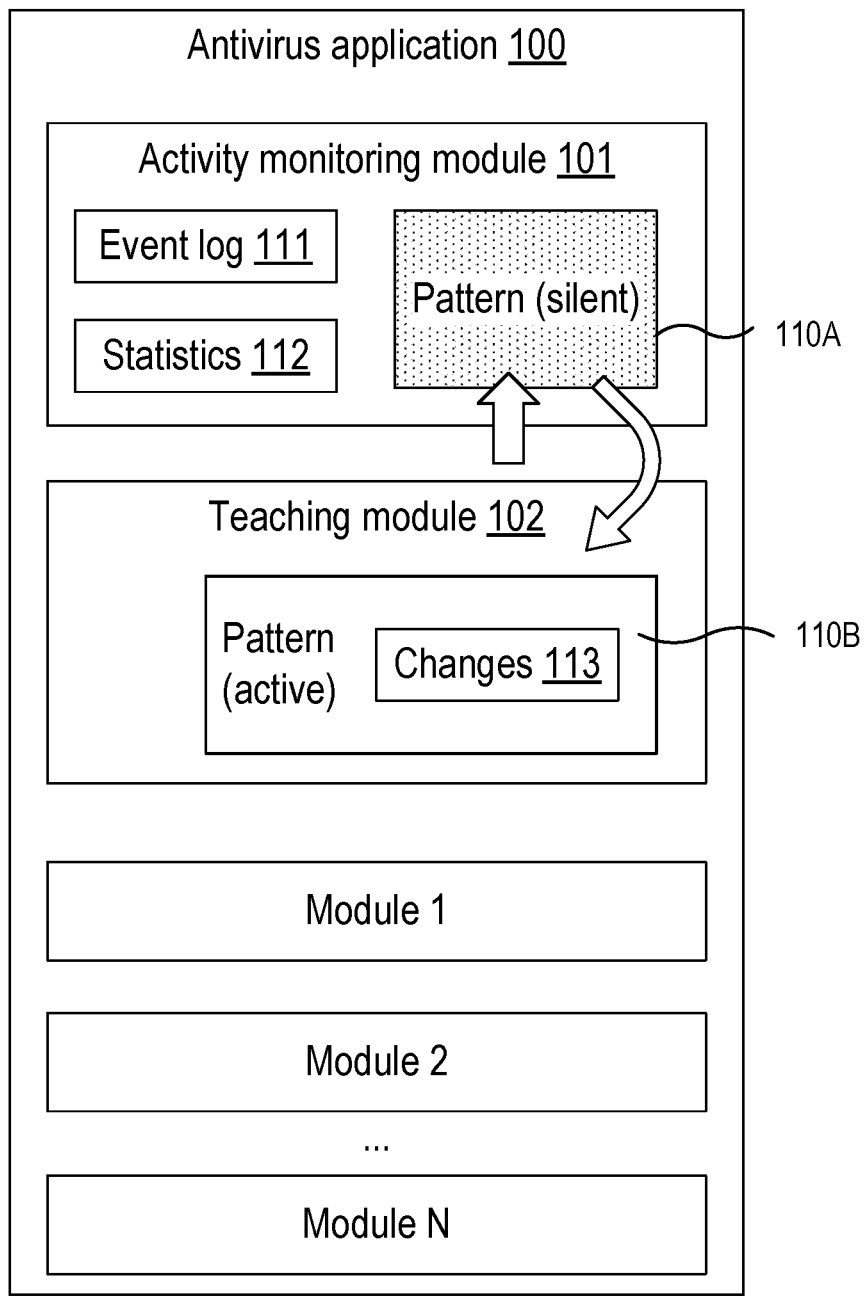
FIG. 1B is a block diagram showing the computer system of a user in greater detail.

FIGS. 1A and 1B illustrate the system of adapting patterns of dangerous behavior of programs to the computer systems of users. In the context of the proposed system, an antivirus application 100 has been launched on the part of the computer system of a user {CS 1, CS 2, ..., CS N}. The antivirus application 100 includes an activity monitoring module 101 and a teaching module 102. The antivirus application 100 also includes other modules {Module 1, Module 2, ..., Module N}, with which, in particular, both the activity monitoring module 101 may interact in the course of working with patterns and the teaching module 102 may interact. Moreover, the antivirus application 100 is communicatively connected to such elements of the infrastructure of an antivirus company as a database of "fuzzy patterns" 103 and to a plurality of services 104. The database of "fuzzy patterns" 103 contains the same aforementioned patterns whose level of false detections has been brought down by the specialists of the antivirus company to a particular level, but is not equal to zero. The services 104 may be any elements of the infrastructure of the antivirus company which are used by the antivirus application 100 remotely, that is, which reside on remote servers of the antivirus company.

The activity monitoring module 101 is configured to detect threats on the computer system of a user that correspond to a pattern of dangerous behavior of programs. The activity monitoring module 101 also monitors events occurring within a computer system, and assembles statistical data on such events. The activity monitoring module 101 may generate an event log 111 which includes a list of events and their parameters (the event parameters are explained in greater detail below). The activity monitoring module 101 contains a subsystem for monitoring user actions, making it possible to determine whether an event related to a pattern has occurred as a result of actions by the user of the computer system, establishing whether an interaction of the user has occurred with the elements of the graphic user interface and/or whether the user has used the data entry means. The determination of the aforementioned facts with the aid of the activity monitoring module 101 together with the recurring nature of the actions being evaluated makes it possible to confirm, with high probability, that those events have resulted in a false threat detection and should be excluded from further detection in the context of the particular pattern. The aforementioned recurring nature of the events is identical to a recurring nature of the events occurring as a result of user actions. Thus, said recurring nature in one variant aspect of the present disclosure can be established from the event log generated by the activity monitoring module 101.

In another variant aspect of the present disclosure, the activity monitoring module 101 may be configured to gather threat detection statistics (or simply statistics 112). The statistics 112 may include at least the following data: a threat identifier, a pattern identifier, the names and hash sums of the files and processes pertaining to the detected threat. Moreover, the statistics 112 contain a list of events which have occurred on the computer system, and their parameters, which have led [events+parameters] to the detection of a threat with the aid of the pattern. While the events in the pattern may be described broadly using wildcards and regular expressions, the statistics contain details about the event having occurred on the computer system. For example, the process "program.exe" has performed a writing to the file "c:\windows\file" with the following characteristics {A1, A2, ..., Am}, which may include for example the values of environment variables, access rights, verdicts from other security systems from a local set of {Module 1, ..., Module N} or from remote services 104, and many other characteristics. The process name, the file name, the system call and its arguments, and also the characteristics {A1, A2, ..., Am} are all event parameters.

The teaching module 102 may be configured to run the pattern 110 of dangerous behavior of programs in the first usage mode (silent usage mode 110A), during which the activity monitoring module 101 detects threats on the computer system that correspond to said pattern, but does not perform actions for their removal (i.e., refrains from performing actions for removing the detected threat). To run the pattern of dangerous behavior of programs, the teaching module 102 may load the pattern of dangerous behavior of programs into the activity monitoring module 101 and establish the mentioned usage mode for it. Furthermore, the teaching module 102 may convert the pattern of dangerous behavior of programs to the second usage mode (active usage mode 110B), wherein the activity monitoring module 101 detects threats on the computer system that correspond to said pattern, and performs actions for their removal. The teaching module 102 also adapts the patterns by adding to them parameters which exclude from subsequent detection those events for which the fulfillment of the aforementioned conditions has been established with the aid of the activity monitoring module 101: (1) the events have occurred as a result of user actions; and (2) the events have been detected more than a given number of times within a given second period of time. That is, the teaching module 102 may modify the patterns by adding parameters which will exclude the events that have occurred as a result of user actions, and the events that occur more than a threshold number of occurrences during a given time period.

The parameters excluding events from subsequent detection may be any of the enumerated parameters and combinations thereof: system calls; arguments of system calls; files, applications, processes or data identifying them; requests for verdicts from any security systems; logic operations. For example, the teaching module may modify a pattern to exclude matches with a particular system call and/or arguments of the system associated with events that occurred as a result of user actions and that occurred more than a threshold number of occurrences during a given time period. In another example, the teaching module 102 may modify a pattern to exclude matches with one or more files associated with events (for example, events for making a change to those files) that occurred as a result of user actions, and that occurred more than the threshold number of occurrences. In another example, the teaching module 102 may modify a given pattern to exclude any system calls, files, applications, and/or processes indicated by verdicts from another security system as being safe or trusted. Further aspects of the parameters are described below in greater detail.

In another variant aspect, the teaching module 102 may analyze the statistics 112 assembled by the activity monitoring module 101 with the use of the pattern (patterns) on the computer system. In the course of the analysis of the assembled statistics, the teaching module calculates the number of false threat detections for the pattern. Malicious programs are characterized as threats, and trusted programs are characterized as falsely detected threats. Teaching module 102 determines that a detected threat is a falsely detected threat by checking the programs corresponding to identified threats using databases of trusted programs after the passage of a specified period of time. From the results of the analysis, the teaching module 102 can add to the pattern of dangerous behavior of programs all falsely detected threats on the given computer system as exceptions.

The aforementioned adding to the pattern of dangerous behavior of programs of all falsely detected threats corresponding to a specific computer system as exceptions can be performed in various ways. In one variant aspect of the present disclosure, in order to exclude from subsequent detection by means of the pattern a falsely detected threat (a trusted program), the teaching module 102 introduces changes 113 in the pattern. In particular, the teaching module 102 adds parameters of events (from the statistics 112) having occurred on the computer system and resulted in false detection of a threat and filters or conditional operators, which are procedures for checking the event parameters so as to exclude from the pattern the actions with the corresponding parameters, to the pattern in whole or in part. In one aspect, the teaching module may add, to a pattern matching file-change-by-a-process events, a parameter that excludes any process or name matching a name of a process and/or file associated with a false positive. For example, all actions of "making changes to a file by a process" will be considered within the pattern, except for the case when the name of the process is "program1.exe" and the file name is "c:\program files\file_1".

In another variant aspect of the present disclosure, the teaching module as mentioned above may add to the pattern of dangerous behavior of programs at least some of the parameters of events (from the statistics) having occurred on the computer system and filters or conditional operators, which are procedures for checking the event parameters so as to exclude from the pattern the events with the corresponding parameters, if those events satisfy at least two of the following three conditions. The first condition is that the events are the actions of a program recognized by the activity monitoring module 101 as being a threat falsely detected with the use of said pattern, where the determination that the program is a falsely detected threat is performed with the aid of the teaching module 102 by checking the program using databases of trusted programs after the passage of a given period of time (for example, the same period as the teaching period). The other two are the conditions whose fulfillment is determined by the activity monitoring module 101 (and with the aid of the subsystem for monitoring user actions), namely: the events have occurred as a result of user actions; and the events have been detected more than a given number of times within a given second period of time. The second period of time may be greater than or equal to the teaching period (greater than or equal to the period counting from the starting point of the teaching period), since the activity monitoring module 101 (as well as the subsystem for monitoring user actions) constantly monitors the events occurring within the computer system and generates an event log, which was mentioned above. Nor is the process of generating this log tied to the starting point of the teaching period of the pattern.

In another variant aspect, in order to exclude from subsequent detection a program that was characterized as falsely detected threat, the teaching module 102 may add the program is added to a list of trusted programs. The list for example may reside locally on the computer system. The teaching module 102 also adds to the pattern a procedure for checking using this list. That is, when running the pattern, if the program is contained on the list, the actions relating to it do not come under the pattern.

Figure 2:
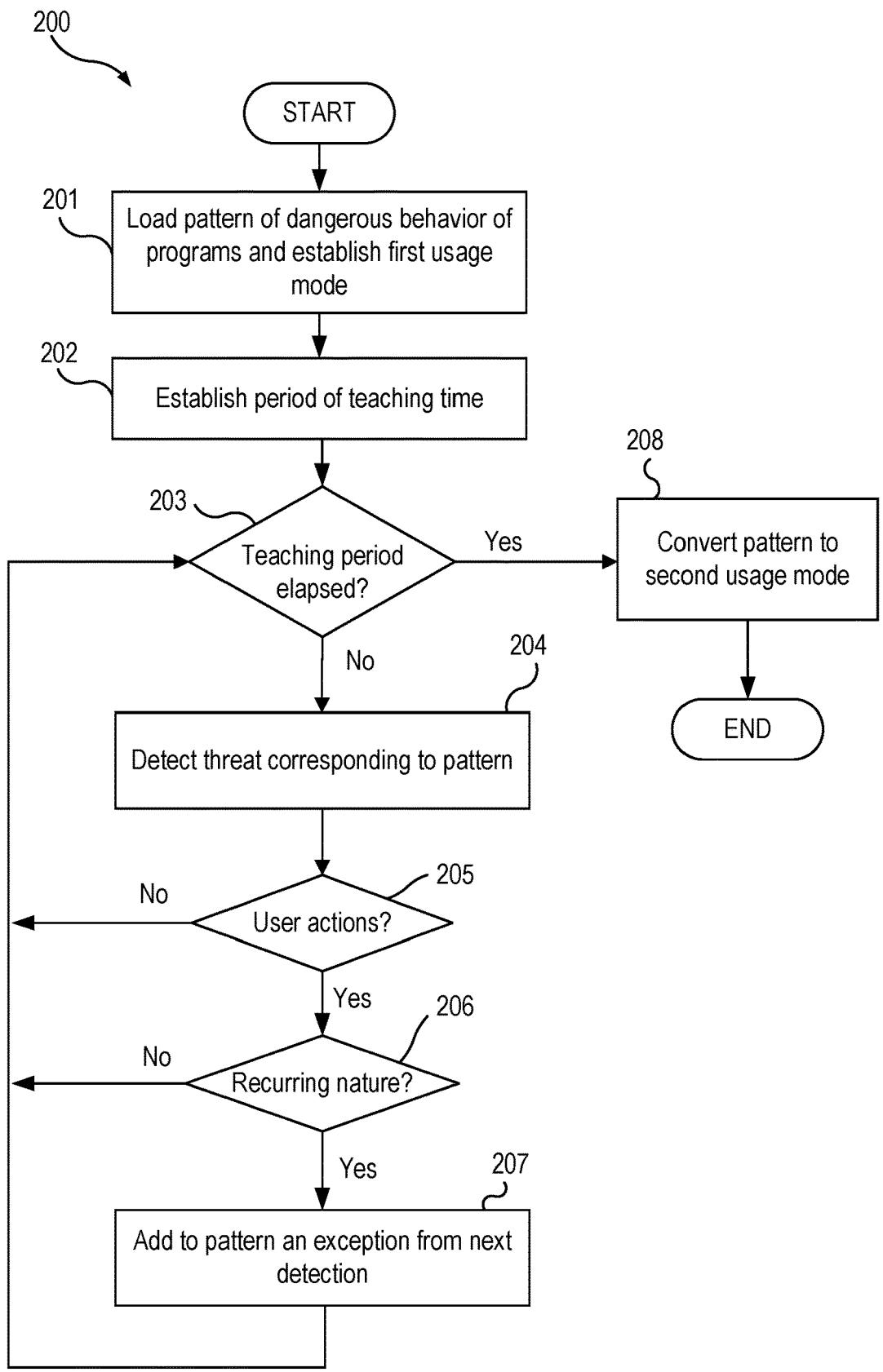
FIG. 2 is a flowchart illustrating a method for adapting patterns of dangerous behavior of programs to the computer systems of users according to an exemplary aspect.

FIG. 2 presents a block diagram of a method 200 of adapting patterns of dangerous behavior of programs to the computer systems of users by changing the parameters of the pattern of dangerous behavior of programs for a computer system.

According to this method 200, in step 201 the teaching module loads into the activity monitoring module a pattern of dangerous behavior of programs and establishes a first usage mode for it, during which the activity monitoring module detects threats on the computer system that correspond to that pattern, but does not perform actions for their removal.

Later on in the course of a given first period of time (teaching period), established in step 202, an iterative cycle 203-206 is carried out. At step 204, the activity monitoring module detects threats corresponding to the mentioned pattern, the detection of the threat being due to the detection of events from the mentioned pattern. In step 207, responsive to determining that the events have occurred as a result of user actions (step 205), and that the events have been detected more than a given number of times within a given second period of time (step 206), the teaching module adds parameters to the mentioned pattern which exclude from subsequent detection those events for which the activity monitoring module has established the fulfillment of the those conditions in steps 205 and 206.

Upon expiration of the specified first period of time (as determined in step 203), the teaching module in step 208 converts the pattern of dangerous behavior of programs to the second usage mode, during which the activity monitoring module detects threats on the computer system that correspond to the mentioned pattern and performs actions for their removal.

In another variant of the present disclosure, a method of selective use of a pattern on computer systems is implemented, whereby the pattern is used in silent mode on a group of computer systems, such as a corporate subnet, for a specified period of time (teaching period). Statistics on the detection of threats corresponding to the pattern are sent from each computer system of the mentioned group to a remote security control center. Each program assigned to the threats with the use of the pattern after the passage of the teaching period is once more checked with the aid of the other security systems, in particular a checking of the programs using "whitelists" is performed. Whitelists are lists of trusted programs and the files and processes corresponding to them. Different whitelists are kept and updated locally on each computer system, and at the remote security control center, and there is also a global white list which can be updated on the part of the antivirus company. Accordingly, a program assigned to the threats with the use of a pattern is considered to be a falsely detected threat if, after the passage of the teaching period, that program is contained on a white list. For each computer system for which the number of false threat detections in the threat detection statistics assembled for that computer system does not exceed an established threshold value, the remote security control center adds to the pattern all falsely detected threats corresponding to the particular computer system as exceptions, and the pattern is converted to the application mode. In other words, if the number of false threat detections does not exceed a threshold over a certain time period, then such a pattern can be adapted to a specific system, for example, to include in the exception pattern for detected false detections. If the number of false thread detections using a pattern exceeds the threshold, then it may be concluded that such a pattern is not suitable for a particular computer system.

Referring back to FIG. 1, in the described system for selective use of patterns of dangerous behavior of programs, there is provided on the user side a group of computer systems {CS 1, CS 2, . . . , CS N}. On each computer system of this group there is running an antivirus application, which includes various modules {Module 1, Module 2, . . . , Module N}, including the activity monitoring module 101. Each antivirus application 100 running on the group of computer systems is communicatively connected to a remote security control module 105, which is configured for centralized control of the security of the group of computer systems. The remote security control module 105 is communicatively connected to such infrastructure elements managed by an antivirus company as a database of "fuzzy patterns" 103 and to services 104. The remote security control module 105 is depicted in FIG. 1 as executing on a computer system on the user side; in alternative aspects, the remote security control module 105 may be deployed on the antivirus company side (as represented in dashed outline).

The activity monitoring module 101, which is part of the antivirus application 100 running on each computer system of the group of computer systems CS, may be configured to detect threats on the computer system of the user which correspond to a pattern of dangerous behavior of programs, and also to dispatch threat detection statistics. As mentioned above, the statistics may include at least the following data: a threat identifier, a pattern identifier, the names and hash sums of the files and processes pertaining to the detected threat. Moreover, the statistics may contain the identifier of the computer system in the group of computer systems, as well as a list of events having occurred on the computer system, and their parameters, which have led [events+parameters] to the detection of a threat with the aid of the pattern.

Figure 3:
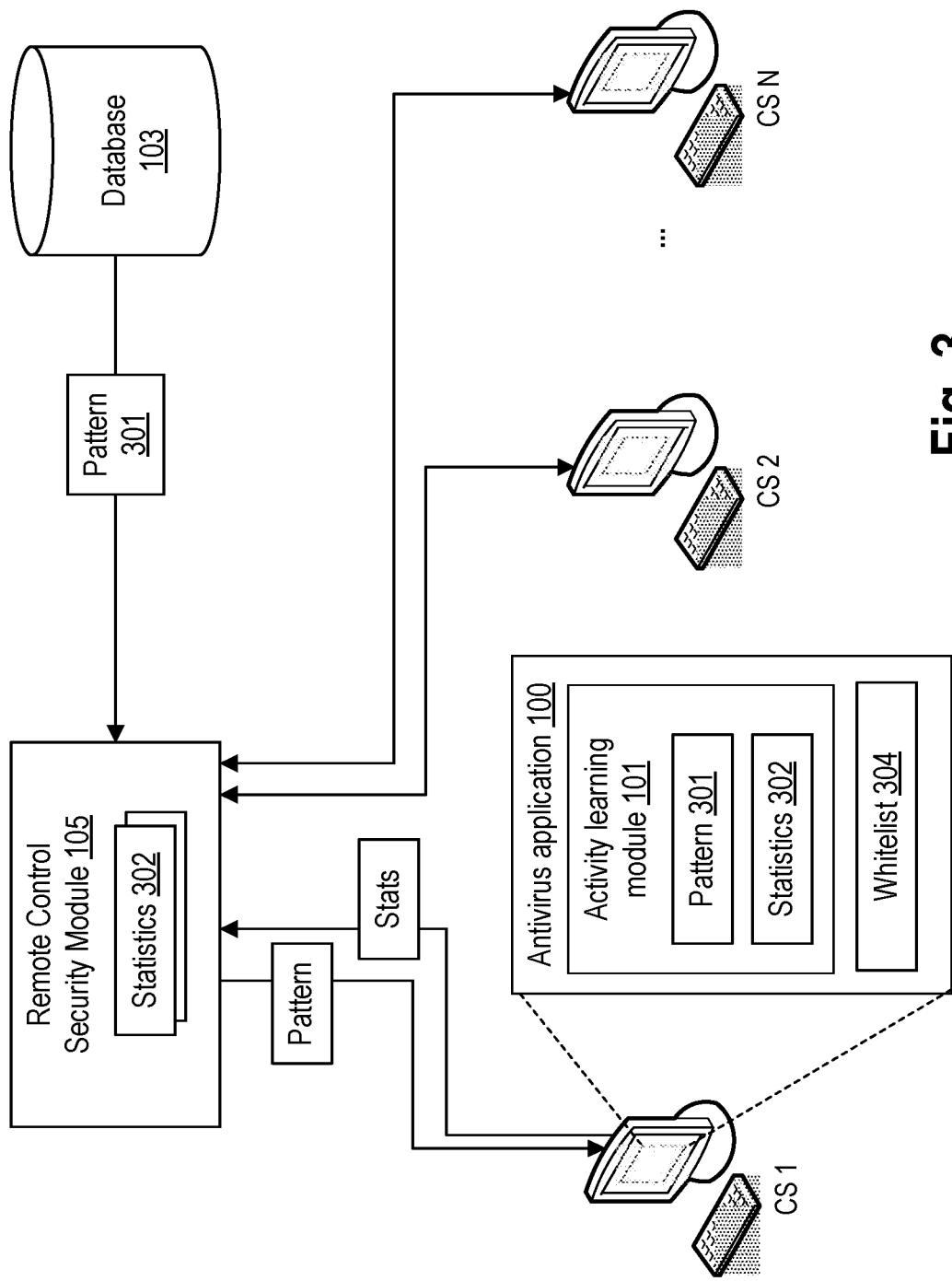
FIG. 3 is a block diagram illustrating a system of adapting patterns of dangerous behavior of programs on a group of computer systems according to an exemplary aspect.

As shown in FIG. 3, the remote security control module 105 in the context of the present disclosure is configured to work with patterns 301 from a database of "fuzzy" patterns 103. With the aid of the remote security control module, a pattern 301 is loaded into the activity monitoring module 101 for each computer system in the group of computer systems and a first usage mode is established for it, during which the activity monitoring module detects threats on the computer system that correspond to the said pattern, but does not perform actions for their removal. The remote security control module 105 also makes it possible to assemble threat detection statistics (or simply statistics 302) corresponding to the pattern. The statistics 302 are assembled for each computer system in the group of computer systems over an established period of time. The period of time is chosen empirically. After the passage of this period of time, the remote security control module 105 performs an analysis of the threat detection statistics 302 assembled with the use of the pattern for each computer system in the group of computer systems. For each computer system, the analysis is performed only for that portion of the statistics assembled with the use of the pattern on the given computer system. The threat detection statistics obtained with the use of the pattern on other computer systems in the group of computer systems are not taken into account during this analysis. In the course of the analysis of the assembled statistics, the number of false threat detections for each computer system is calculated. Malicious programs (files, processes) are threats, and trusted programs (files, processes) are falsely detected threats. The determination that a detected threat is a falsely detected threat is performed with the aid of the remote security control module 105 by checking the programs (files, processes) corresponding to identified threats using databases of trusted programs after the passage of the abovementioned established period of time. From the results of the analysis, for each computer system for which the number of false threat detections in the threat detection statistics assembled for that computer system does not exceed an established threshold value, the following actions are performed with the aid of the remote security control module 105: adding to the pattern of dangerous behavior of programs all of the falsely detected threats corresponding to the specific computer system, as exceptions; and converting the pattern of dangerous behavior of programs to the second usage mode, during which the antivirus application running on the computer system detects threats corresponding to the mentioned pattern and performs actions for their removal.

In another variant aspect, in order to exclude from subsequent detection a program recognized by means of the pattern as a falsely detected threat, the program is added by the remote security control module 105 (or the activity monitoring module) to a list of trusted programs (whitelist 304), said list for example residing locally on the computer system, and a procedure of checking using this list is added to the pattern. If the program is contained on the list, the actions associated with it do not come under the pattern.

Figure 4:
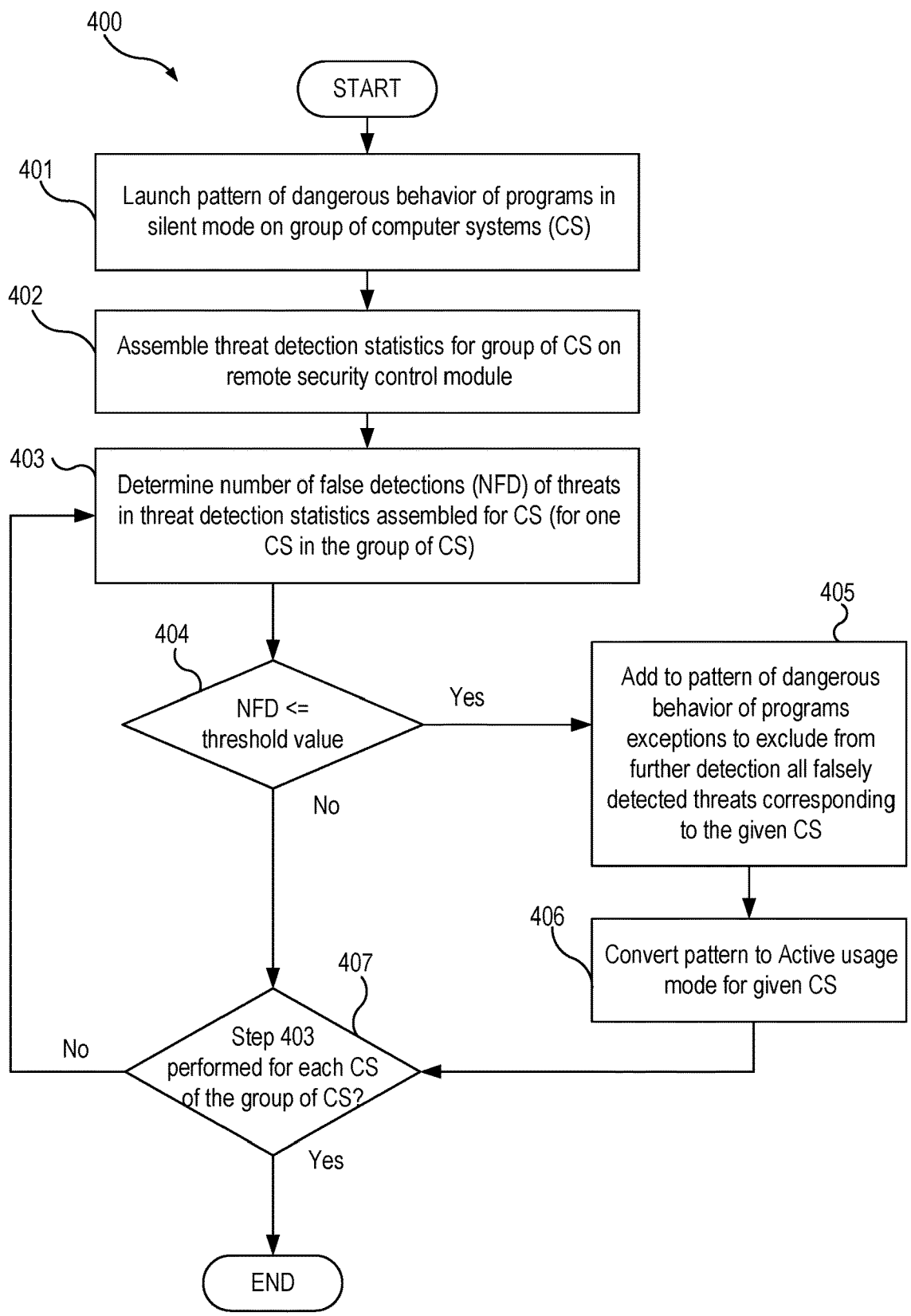
FIG. 4 is a flowchart illustrating a method of selective use of the pattern of dangerous behavior of programs on a group of computer systems according to an exemplary aspect.

FIG. 4 presents a block diagram of a method 400 of selective use of patterns of dangerous behavior of programs. According to this method 400, in step 401 a pattern of dangerous behavior of programs is launched in the first mode on a group of computer systems by means of a remote security control module, wherein the antivirus application running on the computer system detects threats corresponding to the mentioned pattern, but does not perform actions for their removal. To launch a pattern, the remote security control module 105 may load the pattern of dangerous behavior of programs into the activity monitoring modules of the group of computer systems and establish the mentioned usage mode for this pattern. Actions to remove threats include: removal of the malicious program; restoring the computer system; requesting actions from the user; placing the malicious program in quarantine.

In step 402, threat detection statistics are assembled on the remote security control module, relating to the threats corresponding to the mentioned pattern, for each computer system in the mentioned group over an established period of time. Then, in step 403, for each computer system in the group of computer systems (iterative cycle of steps 403-407) the remote security control module determines the number of false detections (using any suitable verification technique described above or known in the art).

For each computer system for which the number of false threat detections in the threat detection statistics assembled for that computer system that does not exceed an established threshold value: in step 405, the remote security control module adds to the pattern of dangerous behavior of programs all of the falsely detected threats corresponding to the specific computer system, as exceptions. In step 406, the remote control security module converts the pattern of dangerous behavior of programs to the second usage mode, during which the antivirus application running on the computer system detects threats corresponding to the mentioned pattern and performs actions for their removal.

Figure 5:
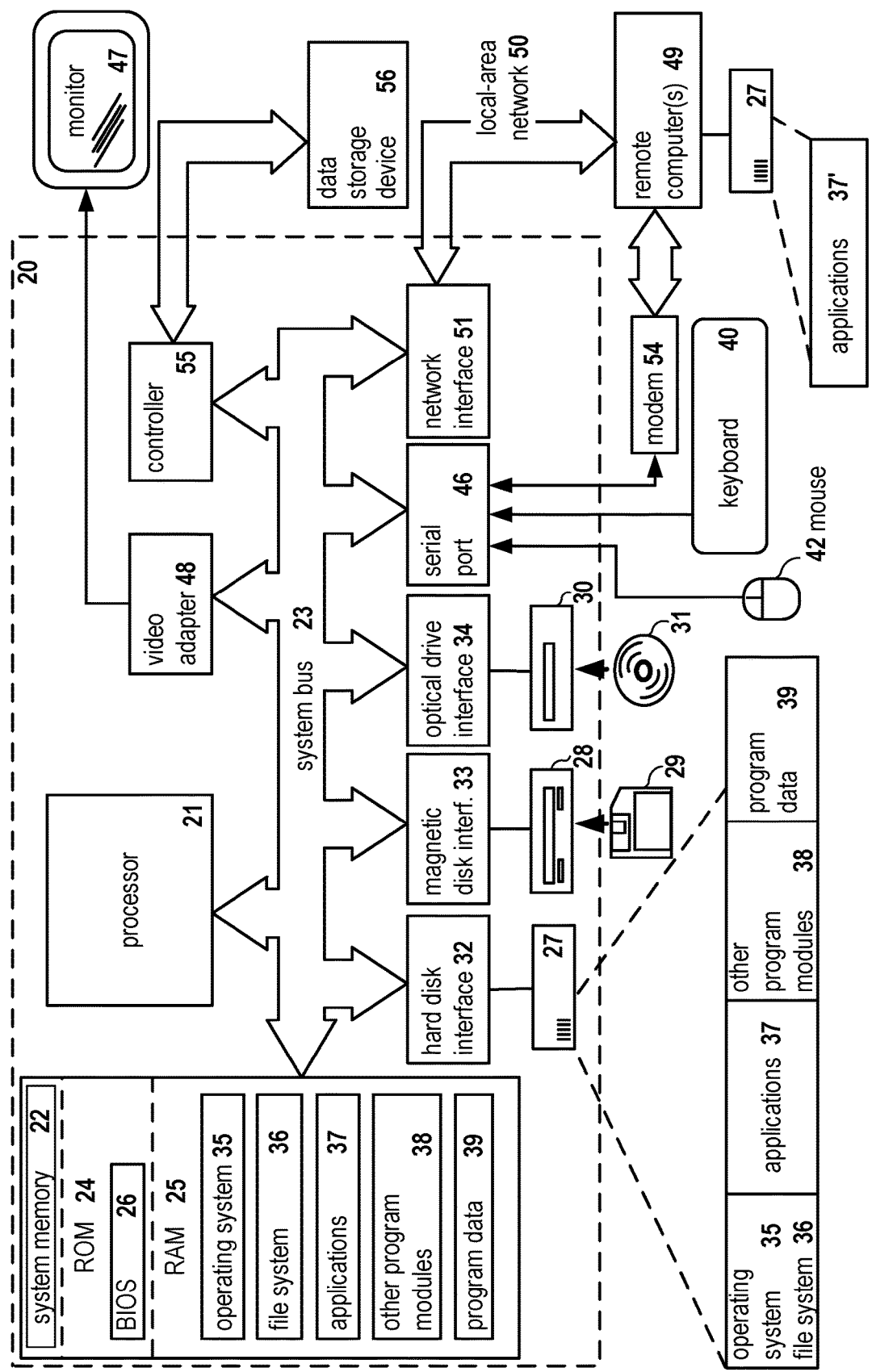
FIG. 5 is a block diagram of a general-purpose computer system on which the disclosed system and method can be implemented according to an exemplary aspect.

FIG. 5 is a block diagram illustrating a general-purpose computer system 20 on which aspects of systems and methods for detecting malicious threads on a computing system may be implemented in accordance with an exemplary aspect. It should be noted that the computer system 20 can correspond to the computer systems (CS1-CSN), for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting malicious programs, the method comprising:
launching, by a remote security control module, a pattern of dangerous behavior of programs in a silent usage mode on a group of computer systems, wherein in the silent usage mode an antivirus application running on each of the computer systems detects threats corresponding to the pattern of dangerous behavior of programs, but does not perform removal actions on the detected threats, and wherein the pattern of dangerous behavior of programs includes examination requests, verdicts from other security systems, and conditional and logic operators for determining sequence of occurrence of the events in the pattern of dangerous behavior of programs;
collecting, by the remote security control module, a plurality of threat detection statistics relating to the threats corresponding to the pattern of dangerous behavior of programs for each computer system in the group of computer systems over a first period of time, wherein the plurality of threat detection statistics include a number of false positive threat detections for the pattern of dangerous behavior of programs on each computer system, and a list of events that occurred on each computer system during launching of the pattern of dangerous behavior of programs and associated event parameters that led to the false positive threat detections;
analyzing, by the remote security control module, the collected statistics to identify events and associated event parameters that caused the false positive threat detections on each of the computer system based on whether the events have occurred as a result of user actions and/or based on whether the events have been detected more than a threshold number of times within a given period of time;
modifying the pattern of dangerous behavior of programs by adding and/or removing the identified events and/or associated event parameters; and
for each computer system in the group of computer systems for which a number of false positive threat detections does not exceed a threshold, adding to the modified pattern of dangerous behavior of programs the false positive threat detections corresponding to the respective computer system as exceptions, and converting the modified pattern of dangerous behavior of programs to an active usage mode.

2. The method of claim 1, wherein using the pattern of dangerous behavior of programs in the active usage mode comprises the antivirus application running on the computer system detecting threats corresponding to the pattern of dangerous behavior of programs and performing actions for removal of the detected threats.

3. The method of claim 1, wherein the number of false positive threat detections is determined by checking a program corresponding to a threat in a database of trusted programs.

4. The method of claim 1, wherein the plurality of threat detection statistics further comprises a threat identifier, a pattern identifier, and names and hash sums of files and processes pertaining to the detected threat.

5. The method of claim 1, further comprising:
adding a program that was falsely characterized as a detected threat to a list of trusted programs.

6. The method of claim 1, wherein the event parameters include one of identifiers of processes, identifiers of addresses, identifiers of address ranges in memory, files, file identifiers and directories.

7. A system for detecting malicious programs, the system comprising:
a network interface configured to communicatively connect the system to a group of computer systems; and
a remote security control module executable by hardware processor and configured to:
launch a pattern of dangerous behavior of programs in a silent usage mode on a group of computer systems, wherein in the silent usage mode an antivirus application running on each of the computer systems detects threats corresponding to the pattern of dangerous behavior of programs, but does not perform removal actions on the detected threats, and wherein the pattern of dangerous behavior of programs includes examination requests, verdicts from other security systems, and conditional and logic operators for determining sequence of occurrence of the events in the pattern of dangerous behavior of programs;
collect a plurality of threat detection statistics relating to the threats corresponding to the pattern of dangerous behavior of programs, for each computer system in the group of computer systems over a first period of time wherein the plurality of threat detection statistics include a number of false positive threat detections for the pattern of dangerous behavior of programs on each computer system, and a list of events that occurred on each computer system during launching of the pattern of dangerous behavior of programs and associated event parameters that led to the false positive threat detections;
analyze the collected statistics to identify events and associated event parameters that caused the false positive threat detections on each of the computer system based on whether the events have occurred as a result of user actions and/or based on whether the events have been detected more than a threshold number of times within a given period of time;
modify the pattern of dangerous behavior of programs by adding and/or removing the identified events and/or associated event parameters; and
for each computer system in the group of computer systems for which a number of false positive threat detections does not exceed a threshold, add to the modified pattern of dangerous behavior of programs the false positive threat detections corresponding to the respective computer system as exceptions, and convert the modified pattern of dangerous behavior of programs to an active usage mode.

8. The system of claim 7, wherein using the pattern of dangerous behavior of programs in the active usage mode comprises the antivirus application running on the computer system detecting threats corresponding to the pattern of dangerous behavior of programs and performing actions for removal of the detected threats.

9. The system of claim 7, wherein the number of false positive threat detections is determined by checking a program corresponding to a threat in a database of trusted programs.

10. The system of claim 7, wherein the plurality of threat detection statistics further comprises a threat identifier, a pattern identifier, and names and hash sums of files and processes pertaining to the detected threat.

11. The system of claim 7, wherein the processor is further configured to:
add a program that was falsely characterized as a detected threat to a list of trusted programs.

12. The system of claim 7, wherein the event parameters include one of identifiers of processes, identifiers of addresses, identifiers of address ranges in memory, files, file identifiers and directories.

13. A non-transitory computer readable medium comprising computer executable instructions for detecting malicious programs, including instructions for:
launching, by a remote security control module, a pattern of dangerous behavior of programs in a silent usage mode on a group of computer systems, wherein in the silent usage mode an antivirus application running on each of the computer systems detects threats corresponding to the pattern of dangerous behavior of programs, but does not perform removal actions on the detected threats, and wherein the pattern of dangerous behavior of programs includes examination requests, verdicts from other security systems, and conditional and logic operators for determining sequence of occurrence of the events in the pattern of dangerous behavior of programs;
collecting, by the remote security control module, a plurality of threat detection statistics relating to the threats corresponding to the pattern of dangerous behavior of programs for each computer system in the group of computer systems over a first period of time, wherein the plurality of threat detection statistics include a number of false positive threat detections for the pattern of dangerous behavior of programs on each computer system, and a list of events that occurred on each computer system during launching of the pattern of dangerous behavior of programs and associated event parameters that led to the false positive threat detections;
analyzing, by the remote security control module, the collected statistics to identify events and associated event parameters that caused the false positive threat detections on each of the computer system based on whether the events have occurred as a result of user actions and/or based on whether the events have been detected more than a threshold number of times within a given period of time;
modifying the pattern of dangerous behavior of programs by adding and/or removing the identified events and/or associated event parameters; and
for each computer system in the group of computer systems for which a number of false positive threat detections does not exceed a threshold, adding to the modified pattern of dangerous behavior of programs the false positive threat detections corresponding to the respective computer system as exceptions, and converting the modified pattern of dangerous behavior of programs to an active usage mode.

14. The non-transitory computer readable medium of claim 13, wherein using the pattern of dangerous behavior of programs in the active usage mode comprises the antivirus application running on the computer system detecting threats corresponding to the pattern of dangerous behavior of programs and performing actions for removal of the detected threats.

15. The non-transitory computer readable medium of claim 13, wherein the plurality of threat detection statistics further comprises a threat identifier, a pattern identifier, and names and hash sums of files and processes pertaining to the detected threat.

* * * * *